US010210857B2

(12) United States Patent
Burgess et al.

(10) Patent No.: US 10,210,857 B2
(45) Date of Patent: Feb. 19, 2019

(54) CONTROLLING AN AUDIO SYSTEM

(71) Applicant: Cirrus Logic International Semiconductor Ltd., Edinburgh (GB)

(72) Inventors: Nigel Burgess, Edinburgh (GB); Mark Allan Watts, Austin, TX (US); Darren Holding, Hampshire (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 15/786,873

(22) Filed: Oct. 18, 2017

(65) Prior Publication Data

US 2018/0108341 A1 Apr. 19, 2018

Related U.S. Application Data

(60) Provisional application No. 62/409,965, filed on Oct. 19, 2017.

(51) Int. Cl.
*G10K 11/16* (2006.01)
*G10K 11/178* (2006.01)
*G06F 3/16* (2006.01)

(52) U.S. Cl.
CPC ............ *G10K 11/178* (2013.01); *G06F 3/165* (2013.01); *G10K 11/17853* (2018.01); *G10K 11/17881* (2018.01); *G10K 11/17885* (2018.01); *G10K 2210/108* (2013.01); *G10K 2210/3045* (2013.01); *G10K 2210/3056* (2013.01)

(58) Field of Classification Search
CPC .......... H04R 3/00; H04R 3/04; H04R 1/1083; H04R 2430/01; G10K 11/178; G10K 11/17881; G10K 11/17853; G10K 11/17885; G10K 2210/108; G10K 2210/3045; G10K 2210/3056; G06F 3/165
See application file for complete search history.

(56) References Cited

U.S. PATENT DOCUMENTS

| 5,251,263 | A | 10/1993 | Andrea et al. |
| 6,160,893 | A | 12/2000 | Saunders et al. |
| 9,275,621 | B2 | 3/2016 | Hamalainen |
| 2009/0046868 | A1 | 2/2009 | Engle et al. |
| 2012/0101819 | A1* | 4/2012 | Heiman ............... H04R 1/1083 704/233 |
| 2013/0163767 | A1 | 6/2013 | Gauger, Jr. et al. |
| 2015/0280669 | A1* | 10/2015 | Vilermo ................. H04R 5/033 381/107 |
| 2016/0210983 | A1* | 7/2016 | Amada ................. G10L 21/034 |

FOREIGN PATENT DOCUMENTS

GB 2484722 A 4/2012

OTHER PUBLICATIONS

Search Report under Section 17, UKIPO, Application No. GB1706837.0, dated Jul. 24, 2017.

* cited by examiner

Primary Examiner — Thang V Tran

(74) Attorney, Agent, or Firm — Jackson Walker L.L.P.

(57) ABSTRACT

A method of controlling an audio system comprises: receiving an audio signal, and applying a first gain to the audio signal and outputting an amplified audio signal. On receiving a user input to increase the first gain applied to the audio signal, if the first gain is at a first threshold value, the method comprises: receiving an ambient noise signal, processing the ambient noise signal with a second gain value and outputting a noise cancellation signal, and changing the second gain value in response to the user input.

5 Claims, 3 Drawing Sheets

CONTROLLING AN AUDIO SYSTEM

This relates to an audio system that includes noise cancellation, and to a method of controlling the noise cancellation in such a system.

BACKGROUND

In environments where ambient noise is present, it is often difficult for users of mobile telephones or other audio devices to hear desired audio signals. In order to overcome this, noise cancellation may be carried out to cancel the ambient noise in the user's ear. In a noise cancellation system, a microphone is provided to detect ambient noise as it approaches the user's ear. The ambient noise signal that is generated by the microphone is then processed to form a noise cancellation signal. This noise cancellation signal is then applied to a speaker that is preferably located close to the user's ear. The signal processing is intended to be such that the sound that is generated by the speaker in response to the noise cancellation signal is of equal magnitude but exactly opposite phase to the ambient noise signal, as the two sounds reach the user's ear. If this can be achieved, noise cancellation occurs.

The gain that is applied as part of the signal processing to form the noise cancellation signal may be controlled, so that the degree of noise cancellation can be adjusted.

SUMMARY

According to a first aspect of the present invention there is provided a method of controlling an audio system comprising: receiving an audio signal, applying a first gain to the audio signal and outputting an amplified audio signal, receiving a user input to increase the first gain applied to the audio signal; and if the first gain is at a first threshold value: receiving an ambient noise signal, processing the ambient noise signal with a second gain value and outputting a noise cancellation signal, and changing the second gain value in response to the user input.

The method may comprise, if the first gain is below a maximum value: increasing the first gain applied to the audio signal in response to the user input.

The first threshold value may be the maximum value of the first gain.

The user input may comprise a signal resulting from a press of a button. In that case, the method may further comprise changing the second gain value independently of the first gain value in response to a signal resulting from a press of the same button having a duration that exceeds a threshold duration.

There is also provided a method of controlling an audio system comprising a loudspeaker and noise cancellation processing circuitry, the method comprising: controlling a volume of a sound played through the loudspeaker in response to a user pressing a first button or a second button for a duration that is shorter (or longer) than a threshold duration; and controlling a degree of noise cancellation produced by the noise cancellation circuitry independently of the volume of the sound played through the loudspeaker, in response to a user pressing the first button or the second button for a duration that is longer (or shorter) than the threshold duration.

According to another aspect of the present invention, there is provided an audio system configured for operating in accordance with the method of the first aspect.

According to a further aspect of the invention, there is provided a computer program product, comprising computer readable instructions for causing a processor to perform the method of the first aspect.

BRIEF DESCRIPTION OF DRAWINGS

For a better understanding of the present invention, and to show how it may be put into effect, reference will now be made, by way of example only, to the accompanying drawings, in which:—

DETAILED DESCRIPTION

Embodiments of the present invention allow a user to change the gain applied to noise cancellation signals. In particular, once the volume of the desired audio signal has reached a maximum, the user can increase the noise cancellation signal further if he/she is still unable to hear the desired audio signal well enough. This allows the user of a device to have control over how much noise cancellation is taking place. The user may also be able to adjust the noise cancellation signal separately to the desired audio level. The actual audio level may be enough, but increased noise cancellation is desired.

Figures 1A, 1B:
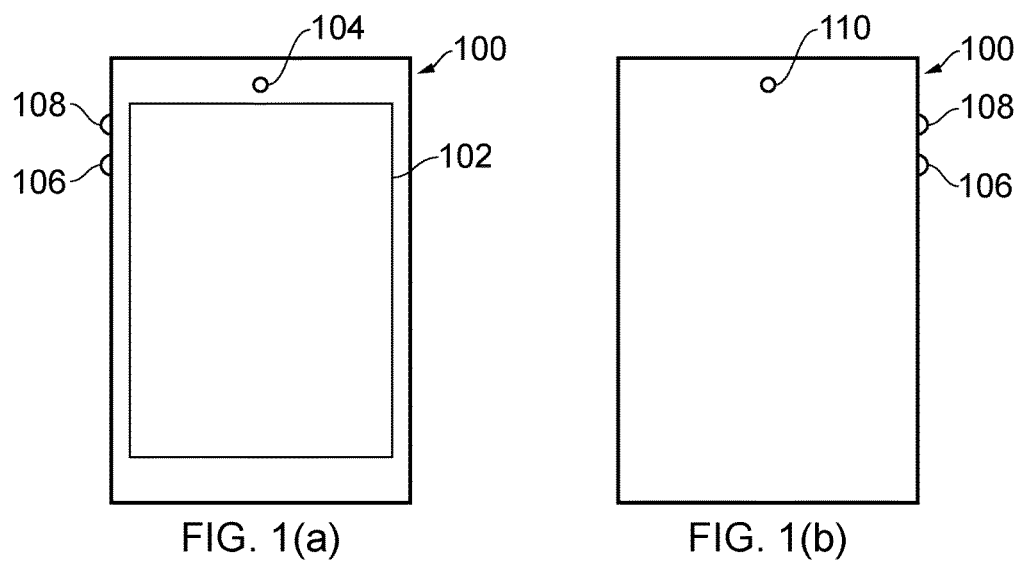
FIGS. 1(a) and 1(b) illustrate a mobile device according to embodiments of the invention.

FIGS. 1(a) and 1(b) illustrate a mobile device 100 according to embodiments of the invention. FIG. 1(a) illustrates a front side of the mobile device 100, which is in this embodiment is a mobile phone. The mobile device 100 comprises a user screen 102, which may be a touch screen, and an audio speaker 104. There are also buttons 106 and 108 which may be used to control the volume of the output of the speaker 104. It will be appreciated that any form of user input actuator may be used.

FIG. 1(b) illustrates a back side of the mobile device 100. Buttons 106 and 108 can also be side from the back side, along with a microphone 110. The microphone 110 may be used to detect ambient noise and generate an ambient noise signal, in particular whilst the mobile device is being used to make a telephone call.

FIGS. 1(a) and 1(b) show an audio system being included in a mobile device in the form of a mobile phone, specifically a smartphone. However, the mobile device may be any other portable electronic device, for example a tablet or laptop computer, a games console, a home control system, a home entertainment system, an in-vehicle entertainment system, a domestic appliance, or the like.

Figure 2:
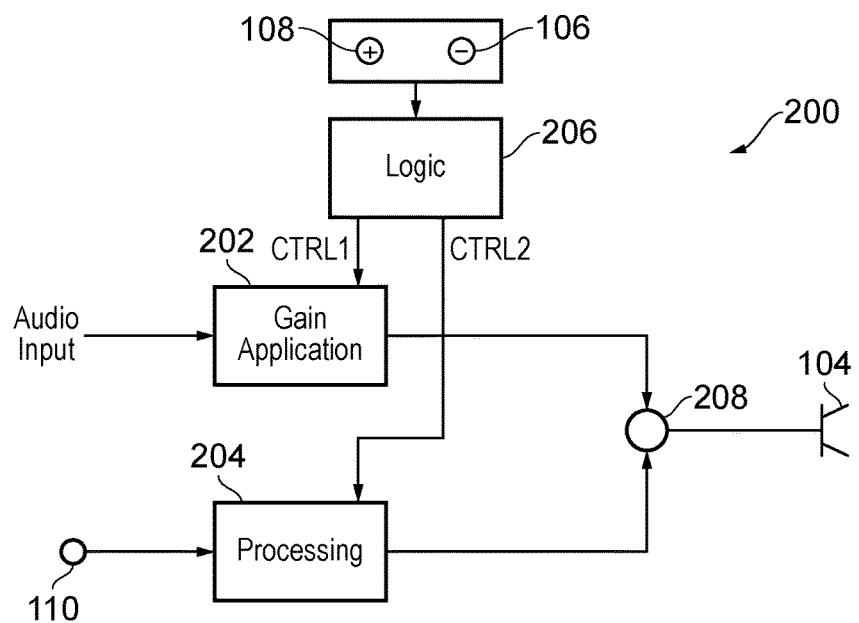
FIG. 2 illustrates a block diagram of an audio system according to embodiments of the invention.

FIG. 2 illustrates an audio system 200 according to an embodiment of the invention. The system 200 receives an audio input signal which may for example be a signal relating to the content of a telephone call received over a transceiver, or which may for example be a signal from a playback device such as an audio/video device, or an MP3 player. A first gain is applied to this signal in a gain application block 202. An amplified audio signal is output from the gain application block 202. This amplified audio signal may be output through a speaker such as the speaker 104.

A microphone such as the microphone 110 detects ambient noise approaching the ear of the user, when the device 100 is being held in its normal operating position with the speaker 104 facing the user's ear. The microphone 110 generates an ambient noise signal, which is input into a processing block 204. The processing block 204 may apply a second gain to provide a noise cancellation signal. In some embodiments, the second gain may for example be a simple scaling of the ambient noise signal. In other embodiments, the processing block performs a filtering of the ambient noise signal to produce a signal that achieves the maximum possible noise cancellation. In such embodiments, the second gain may be an adjustable attenuation that is applied to this signal in order that the degree of noise cancellation may be scaled down. FIG. 2 shows a feedforward noise cancellation system, but the processing block 204 may also receive an additional input signal from a further microphone (not shown in FIG. 2) that is located close to the ear of the user when the device 100 is held in its normal operating position with the speaker 104 facing the user's ear, and the processing performed by the processing block 204 may also take account of this additional feedback signal.

The noise cancellation signal may be added to the amplified audio signal in an adder 208 and output through a speaker such as the speaker 104.

A user logic block 206 outputs control signals CTRL1 and CTRL2 which control aspects of the gain application block 202 and the processing block 204 respectively. In this embodiment, the user logic block 206 may be controlled by user inputs through the buttons 106 and 108. The logic carried out within the user logic block 206 is described further with reference to FIG. 4. The user logic block 206 may include a memory for storing suitable program instructions corresponding to the method shown in FIG. 4, and a processor for performing the method based on the stored instructions.

In embodiments of the invention the user presses the button 106 when the user wants to decrease the volume of the audio signal being output by the speaker, and presses the button 108 to increase the volume of the audio signal being output by the speakers.

In embodiments of the invention, when the gain applied by the gain application block 202 reaches a predetermined threshold value, further presses of the button 108 will have no effect on this gain value.

In other embodiments of the invention, the user logic block 206 may take account of more than just single presses of the buttons 106 and 108. For example, the apparatus may be configured such that single isolated presses of buttons 106 and 108 may alter the first gain or the second gain as described above. Meanwhile, the apparatus may also be configured to recognise when a button press has a duration that is longer than a predefined minimum duration, and such a long button press may cause the second gain to be increased or decreased, e.g. incremented or decremented, independently of the control of the first gain.

Figure 3:
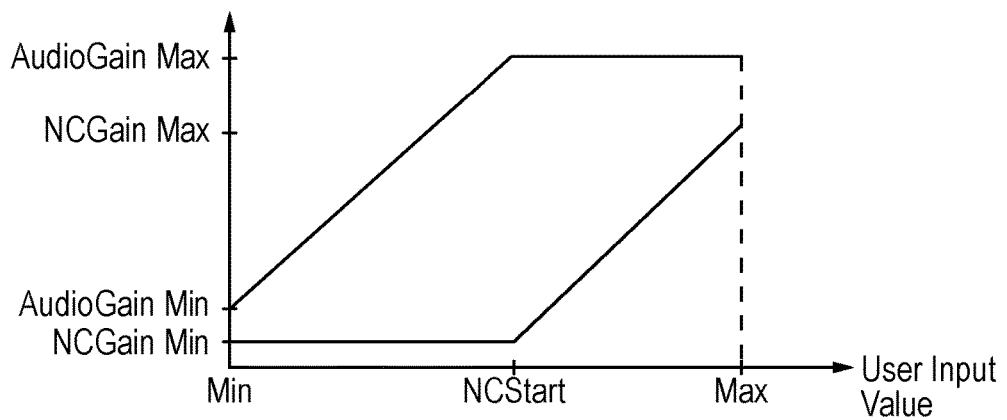
FIG. 3 illustrates a graph of both the gain in an audio path and the gain in a noise cancellation path as a function of a user input value.

FIG. 3 is a graph 300 illustrating values of the first gain 302 and the second gain 304, both as functions of a user input value.

The user input value is a value created by the number of button presses on the buttons 106 and 108 or by user selecting a noise cancellation via another input method. The user input value has a maximum and minimum value. For example, if the user input value reaches a maximum value, further presses of the button 108 will have no effect but a press of the button 106 will reduce the user input value. Equivalently, if the user input value reaches a minimum value, further presses of the button 106 will have no effect, but a press of the button 108 will increase the user input value.

As can be seen from the graph 300, as the user input value increases from its minimum value, the first gain 302, which is the gain applied in the audio path in Gain block 202, is increased from a minimum value AudioGainMin, up to a maximum value, AudioGainMax. Then as the user input value increases further, for example as the user continues to press the button 108, there is no further effect on the gain in the audio path. Thus, the device has reached its maximum volume setting.

As can also be seen in the graph 300, once the user input value reaches a predetermined value, NCStart, the second gain, which is a gain applied in processing block 204, is increased from its minimum value, NCGainMin, up to a maximum value, NCGainMax. This maximum value NCGainMax is reached once the user input value is at the maximum user input value.

In some embodiments, the user input value NCStart is the value at which the first gain reaches the maximum AudioGainMax. However, it will be appreciated that in some embodiments, AudioGainMax will be reached at a higher user input value than NCstart or at a lower user input value than NCStart.

In some embodiments the minimum first gain value, AudioGainMin, is zero. However, it will be appreciated that in some embodiments the minimum first gain value is some nominal gain value.

In some embodiments there in no noise cancellation processing at all at user input values below NCStart. In other embodiments the second gain has a value of zero at user input values below NCStart. However, it will be appreciated that the minimum second gain value, NCGainMin, may be a positive gain value.

In this embodiment the relationships between the both the first gain and the second gain and the user input value are shown to be linear, however, it will be appreciated that polynomial or other desired relationships may be used.

Figure 4:
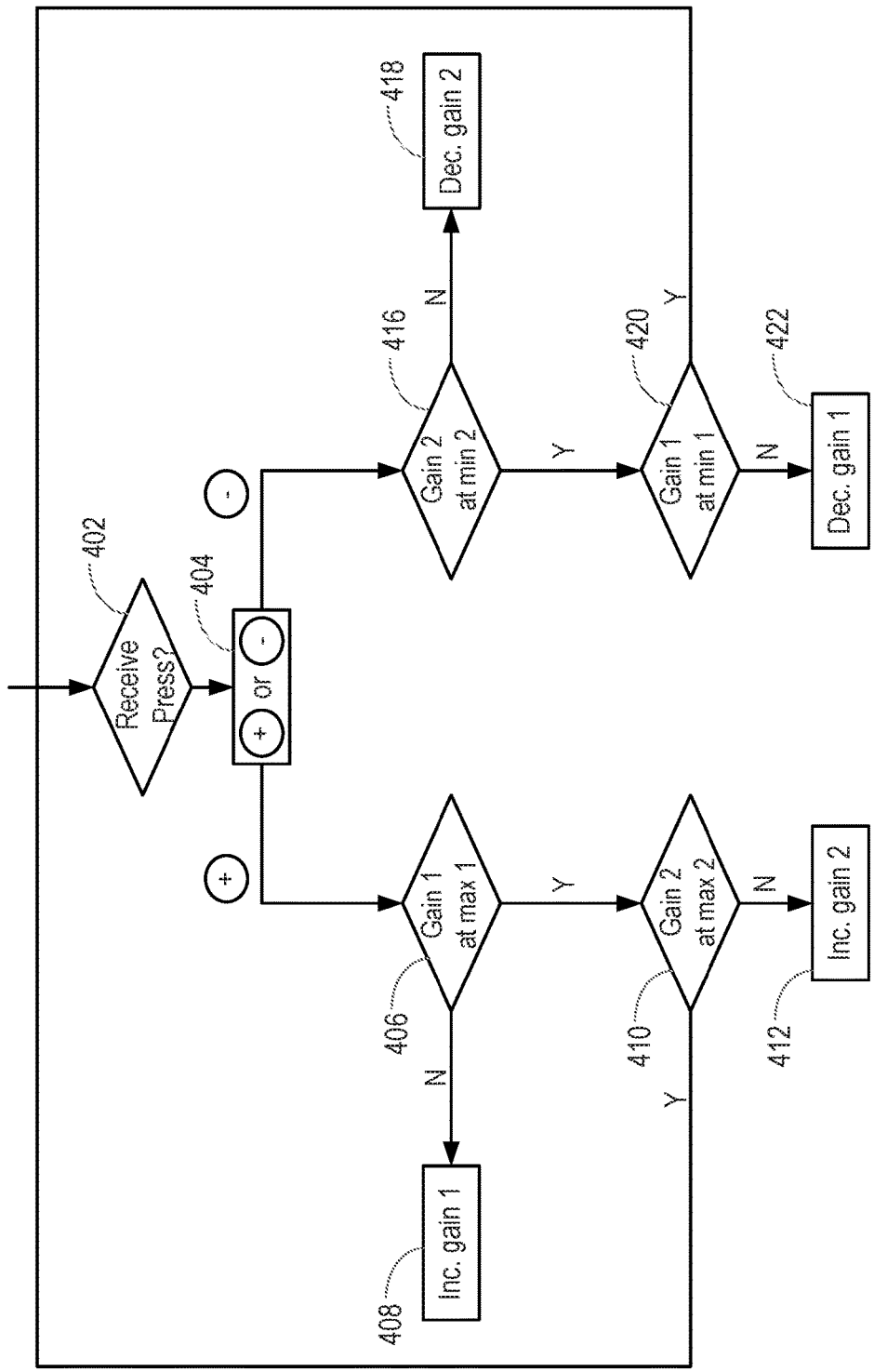
FIG. 4 is a flowchart of a method according to embodiments of the invention.

FIG. 4 is a flow chart illustrating the logic carried out by the user logic block 206. The logic shown here assumes that the user input value NCStart is the value at which the first gain reaches the maximum AudioGainMax. Slight changes to the logic can implement other embodiments, as desired.

In step 402 the user logic block determines whether or not there has been a button press. It will be appreciated that other forms of user input may be used.

In step 404 it is determined whether the button press indicated an increase in gain or a decrease in gain. That is, in the illustrated embodiment, it is determined whether the button 108 or the button 106 was pressed.

If an increase in gain was indicated, the method passes to step 406, where it is determined whether the first gain in the audio path is at a maximum value, namely AudioGainMax shown in FIG. 3.

If the first gain in the audio path is not at a maximum value, the user logic block 206 sends a command to the gain application block to increase the first gain in step 408.

If the first gain is at a maximum value, namely AudioGainMax, the user logic block determines in step 410 if the second gain in the noise cancellation path is at a maximum value, namely NCGainMax.

If in step 410 it is determined that the second gain in the noise cancellation path is not at a maximum value, the user logic block 206 sends a command to the processing block 204 to increase the second gain in step 412.

If in step 410 it is determined that the second gain is at a maximum value, namely NCGainMax, the user logic block returns to step 402. Thus, in this case, further presses of the button 108 have no effect.

If at step 404 it is determined that the button press indicated a decrease in gain, the method passes to step 416 in which the user logic block 206 determines if the second gain in the noise cancellation path is at a minimum value, namely NCGainMin.

If in step 416 it is determined the second gain is not at a minimum the user logic block determines that the user input value is in the region above NCStart, and sends a command to the processing block 204 to decrease the second gain in step 418.

If in step 416 it is determined that the second gain is at a minimum value the user logic block determines that the user input value is in the region below NCStart, and then determines if the first gain in the audio path is at a minimum value in step 420.

If in step 420 it is determined the first gain is not at a minimum value, the user logic block sends a command to the gain application block 202 to decrease the first gain in step 422.

If in step 420 it is determined the first gain is at a minimum value, the user logic block returns to step 402. Thus, in this case, further presses of the button 106 have no effect.

Thus, when a user enters an area where there is loud ambient noise, the user can increase the volume to a maximum level by successive presses of the button 108. When the maximum volume is reached, further presses of the button 108 have no effect on the volume of the wanted sound, but increase the aggressiveness of the noise cancellation that is applied.

Figure 5:
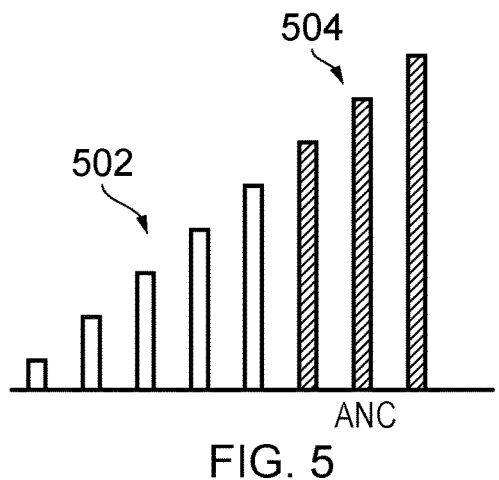
FIG. 5 illustrates a screen display during use of a first method.

FIG. 5 illustrates a display that may be provided, for example on the screen 102, when the buttons 106, 108 are pressed. Thus, bars 502 illustrate the volume that has been selected, while bars 504, which may be in a different colour, from the bars 502, indicate the degree of noise cancellation that is being applied. The volume, and the degree of noise cancellation, may be indicated by changing the colours of bars that are present at all times, or by only displaying a number of bars that corresponds to the volume, or the degree of noise cancellation.

This form of display is appropriate, for example, in the case where, as described with reference to FIGS. 3 and 4, the user input value NCStart is the value at which the first gain reaches the maximum AudioGainMax, while the second gain is at its minimum value NCGainMin.

Figure 6:
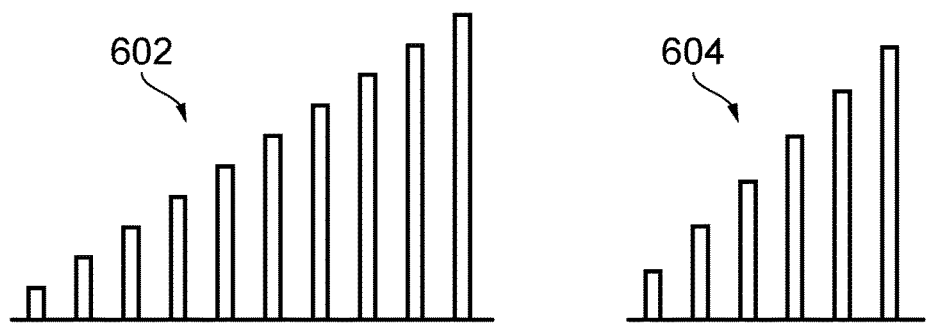
FIG. 6 illustrates a screen display during use of the method.
Figure 3:
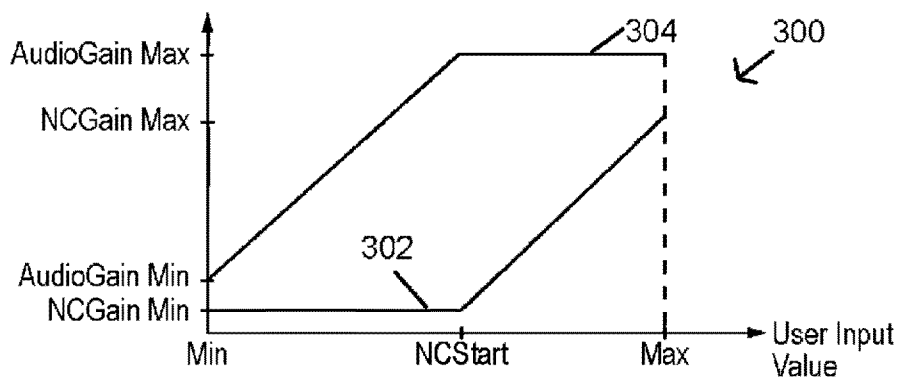
Figure 5:
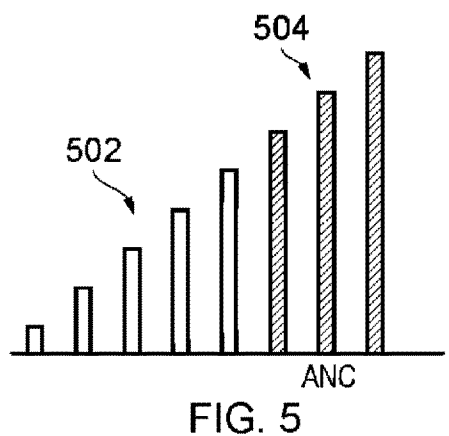
Figure 6:
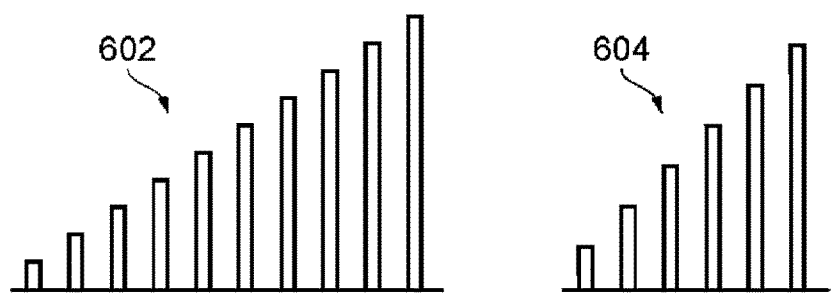

FIG. 6 illustrates an alternative display that may be provided, for example on the screen 102, when the buttons 106, 108 are pressed. In this case, bars 602 illustrate the volume that has been selected. The volume may be indicated by changing the colours of bars that are present at all times, or by only displaying a number of bars that corresponds to the volume. Bars 604 indicate the degree of noise cancellation that is being applied. The degree of noise cancellation may be indicated by changing the colours of bars that are present at all times, or by only displaying a number of bars that corresponds to the degree of noise cancellation.

This form of display is appropriate, for example, in cases where the user input value at which the first gain reaches its maximum value is not the same as the user input value at which the second gain is at its minimum value. In this situation, there may be a region of user input values over which the volume, and the degree of noise cancellation, are both changing. It may then be appropriate to show the current values of both the volume, and the degree of noise cancellation.

Alternatively or additionally, the apparatus may be configured such that the buttons 106 and 108 may be used to control the volume and the degree of noise cancellation in different ways. For example, the buttons 106 and 108 may accept different forms of user input, and these may be used to control the volume and the degree of noise cancellation independently of each other. This may apply in cases where the degree of noise cancellation is adjusted in response to a button press whenever the volume is at its maximum. This may also apply in cases where the degree of noise cancellation is not controlled in this way. For example, single isolated presses of buttons 106 and 108 may alter the first gain or the second gain as described above, whereas a button press of duration longer than a predefined minimum may cause the second gain to be increased or decreased, and therefore cause the degree of noise cancellation to be increased or decreased.

In this case, the degree of noise cancellation can be increased or decreased independently of the volume. Therefore, the form of display shown in FIG. 6 is also appropriate in this case, as the volume and the degree of noise cancellation can be indicated separately.

There is therefore provided a method of controlling an audio system. In particular the method allows a user to increase the gain applied in a noise cancellation path to help improve the quality of an audio signal in noisy environments.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfill the functions of several units recited in the claims. Any reference numerals or labels in the claims shall not be construed so as to limit their scope.

The invention claimed is:

1. A method of controlling an audio system comprising:
receiving an audio signal,
applying a first gain to the audio signal and outputting an amplified audio signal,
receiving a user input to increase the first gain applied to the audio signal; and
if the first gain is below a maximum value:
increasing the first gain applied to the audio signal in response to the user input; and
if the first gain is at or above a first threshold value:
receiving an ambient noise signal,
processing the ambient noise signal with a second gain value and outputting a noise cancellation signal, and
changing the second gain value in response to the user input.

2. A method as claimed in claim 1 wherein the first threshold value is the maximum value of the first gain.

3. An audio system, comprising:
an input for receiving an audio signal;
an input for receiving a user input;
an input for receiving an ambient noise signal;
an output; and
a controller unit configured to perform functions of:
applying a first gain to the received audio signal and outputting an amplified audio signal to the output,
in response to the received user input, increasing the first gain applied to the received audio signal;
if the first gain is below a maximum value:
increasing the first gain applied to the audio signal in response to the user input; and
if the first gain is at or above a first threshold value:
processing the received ambient noise signal with a second gain value and outputting a noise cancellation signal to the output, and
changing the second gain value in response to the user input.

4. A computer program product, comprising computer readable instructions embodied in non-transitory computer-readable media, the instructions when read and executed by the processor, for causing a processor to perform a method comprising:
receiving an audio signal,
applying a first gain to the audio signal and outputting an amplified audio signal,
receiving a user input to increase the first gain applied to the audio signal;
if the first gain is below a maximum value:
increasing the first gain applied to the audio signal in response to the user input; and
if the first gain is at or above a first threshold value:
receiving an ambient noise signal,
processing the ambient noise signal with a second gain value and outputting a noise cancellation signal,
changing the second gain value in response to the user input.

5. A method of controlling a mobile device having an audio playback function and a noise cancellation system, the method comprising:
receiving volume control inputs from a user and determining whether a volume of audio playback is at an upper limit in response to the received volume control inputs; and
if the determined volume of the audio playback is not at the upper limit, increasing the volume of the audio playback in response to successive volume control inputs from the user until the upper limit is reached, and thereafter increasing a gain value in the noise cancellation system.

* * * * *

UNITED STATES PATENT AND TRADEMARK OFFICE
CERTIFICATE OF CORRECTION

PATENT NO. : 10,210,857 B2
APPLICATION NO. : 15/786873
DATED : February 19, 2019
INVENTOR(S) : Burgess et al.

Page 1 of 2

It is certified that error appears in the above-identified patent and that said Letters Patent is hereby corrected as shown below:

On the Title Page

In Item (60), under "Related U.S. Application Data", in Column 1, Line 2, delete "2017." and insert -- 2016. --, therefor.

In the Drawings

Delete existing Drawing Sheet 3 and insert Replacement Drawing Sheet 3 therefor.

In the Specification

In Column 2, Line 20, delete "invention; and" and insert -- invention; --, therefor.

In Column 4, Line 35, delete "there in no" and insert -- there is no --, therefor.

In Column 4, Line 41, delete "between the both" and insert -- between both --, therefor.

In Column 5, Line 14, delete "determined the" and insert -- determined that the --, therefor.

In Column 5, Line 24, delete "determined the" and insert -- determined that the --, therefor.

In Column 5, Line 28, delete "determined the" and insert -- determined that the --, therefor.

Signed and Sealed this
First Day of October, 2019

Andrei Iancu
*Director of the United States Patent and Trademark Office*